C. H. NORTON.
CLUTCH OPERATING MEANS.
APPLICATION FILED MAY 31, 1913.

1,211,747.

Patented Jan. 9, 1917.

Witness
C. F. Mason.

Inventor:
C. H. Norton
by Attorneys
Southgate & Southgate.

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

CLUTCH-OPERATING MEANS.

1,211,747.  Specification of Letters Patent.  Patented Jan. 9, 1917.

Application filed May 31, 1913. Serial No. 771,062.

*To all whom it may concern:*

Be it known that I, CHARLES H. NORTON, a citizen of the United States, residing at Worcester, in the county of Worcester and State of Massachusetts, have invented a new and useful Clutch-Operating Means, of which the following is a specification.

This invention relates to a clutch operating means especially designed for the head stock of a grinding machine but capable of general use.

The principal objects thereof are to provide a comparatively simple construction for this purpose which, with the motor for operating it, shall be contained in a single structure, movable as a whole, so that all the parts can be assembled by the manufacturer and thereafter manipulated as one single element; also to provide an improved friction clutch operating device conveniently arranged for being controlled by the operator of the machine from a convenient point independently of the location of the head stock along the bed.

The invention also involves improvements in details of construction and combinations of parts as will appear hereinafter.

Reference is to be had to the accompanying drawings, in which—

Figure 1:
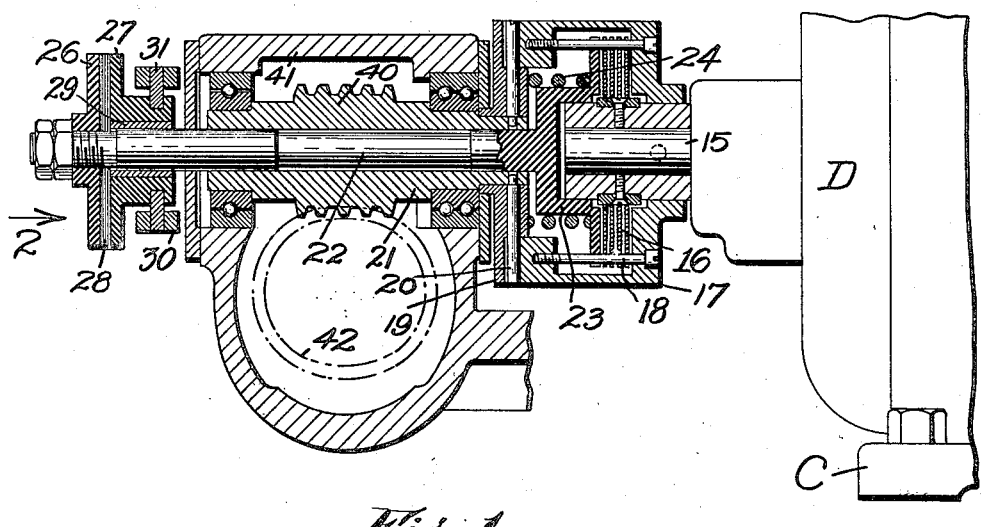
Figure 2:
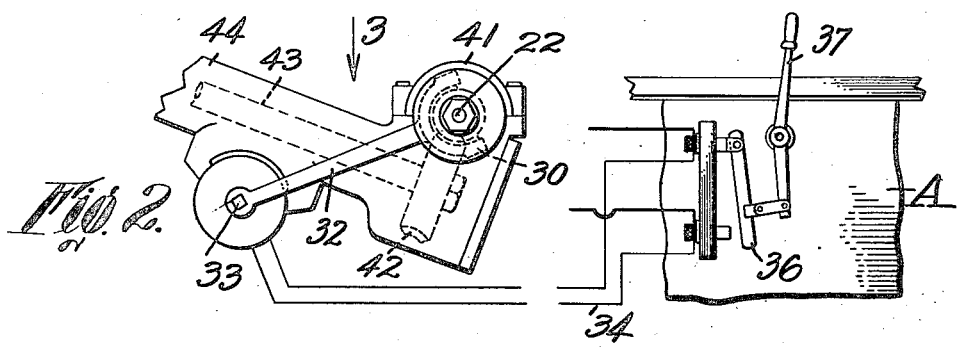
Figure 3:
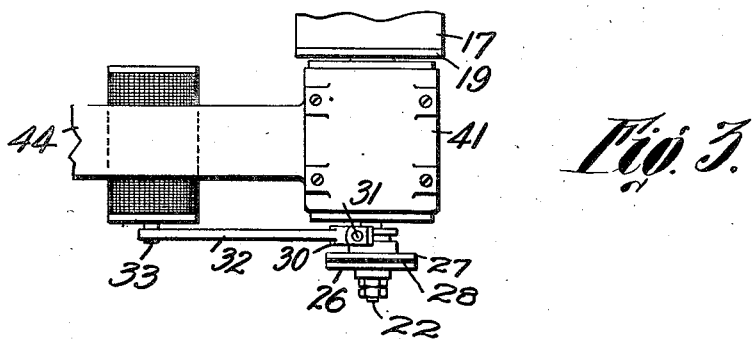

Figure 1 is a longitudinal central sectional view of the motor shaft and connected parts at the head end of a grinding machine showing a preferred embodiment of this invention applied thereto; Fig. 2 is an end elevation of the means for controlling the clutch and Fig. 3 is a plan view of the same.

The invention is shown as applied to a grinding machine having a bed A. On the ways of the work table is mounted a casting C forming the base of the head stock and supporting the parts thereof.

On the head stock C is mounted an electric motor D for operating the parts. This motor is provided with a shaft 15 to which is connected a part of the friction disks 16 of a friction clutch. Rotatably mounted on this shaft is a cylindrical casting 17 constituting the casting of the friction clutch and provided with bolts 18 for supporting the other half of the friction plates constituting the clutch proper. The end of the clutch is closed by a plate 19 bolted to the casting 17. The bolts 20 which secure these parts together also secure them fixedly to a worm transmission shaft 21 which is in axial alinement with the shaft 15 and which can be fixed thereto by the friction clutch as will be obvious.

Through the center of the shaft 21 passes an operating rod 22 which is provided on the end thereof with a cup 23 about which is arranged a strong spring 24 bearing at one end on a flange extending out from the cup and at the other end on the plate 19. Normally this spring forces the cup to the right in Fig. 2, and keeps the clutch closed so that power will be transmitted directly from the shaft 15 to the shaft 21. The rod 22 is capable of reciprocation in the shaft 21, and for the purpose of operating it conveniently independently of the position in which the head stock may be located, the following mechanism is shown:—On the end of this rod is a plate 26 and slidably mounted on the rod is a flanged hub 27, between which are leather washers 28. The plate 26 rotates with the rod 22 which also ordinarily rotates with the shaft 21, although not positively fixed to it. The hub 27 is separated from the rod 22 by a bushing 29 and is operated by a yoke 30 which is pivoted to the collar by pins 31. This yoke has an arm or lever 32 connected with the movable armature 33 of an electro-magnet or solenoid. The wiring 34 to this electro-magnet and to the motor is supported from the rear of the main head stock casting C. The electromagnet is controlled by a switch 36 having an operating handle 37 on the front of the bed A located in convenient position for manipulation by the operator. This is connected with that part of wiring 34 which goes to the solenoid. This being flexible, permits the head stock to be adjusted without interfering with the connections.

The shaft 21 is provided with a worm 40 located in a casing 41 and meshing with a worm wheel 42 on an inclined shaft 43 supported in bearings 44 on the head stock. At the other end, that is its upper and rear end, this shaft 43 is provided with means for driving the head center (not shown).

It will be seen that by the arrangement described a self-contained motor drive for the head stock is provided which can be manipulated readily in a very expeditious manner by the operator of the machine standing at the front, and furthermore, it will be seen that by having the parts contained all in a single structure, which is movable by itself independently of the rest of the machine, advantages are secured in the manufacture, assembling, and transportation of the device as well as in its ordinary use.

Although I have illustrated and described only a single embodiment of the invention, I am aware of the fact that many modifications can be made therein by any person skilled in the art, without departing from the scope of the invention as expressed in the claims. Therefore I do not wish to be limited in these respects, but What I do claim is:—

1. In a head stock for a grinding machine, the combination of a motor shaft, a transmission shaft in alinement with the motor shaft, a friction clutch surrounding the end of the motor shaft for connecting said shafts, a rod extending all the way through the transmission shaft for operating said clutch, and means beyond the end of the transmission shaft for reciprocating the rod.

2. In a head stock for a grinding machine, the combination of a shaft, a second shaft, a friction clutch for connecting said shafts, a rod extending through said second shaft, and movable independently thereof, for opening said clutch, means for closing the clutch, a plate on the end of said rod beyond the second shaft, a hub slidably mounted on the rod beyond the end of the second shaft, a friction washer between the plate and hub, means for manipulating the hub and a handle on the front of the machine for controlling the operation of said means.

3. In a grinding machine, the combination of a bed, a motor shaft, a second shaft in alinement with the motor shaft, a clutch for connecting said second shaft with the motor shaft, a rod extending from the clutch for operating it, and having a cup on the end for receiving the end of the motor shaft, a spring on said cup for normally closing the clutch, said second shaft having a hollow casing thereon inclosing said cup, clutch, and spring, and means mounted on the front of said bed for controlling said rod.

4. In a grinding machine, the combination of a motor shaft, a transmission shaft, a clutch for connecting the motor shaft with the transmission shaft, said clutch having a spring for normally holding the clutch closed, a rod extending from the clutch for operating it, and a solenoid for operating said clutch in opposition to the spring to open the clutch and stop the rotation of the transmission shaft from the motor shaft.

In testimony whereof I have hereunto set my hand, in the presence of two subscribing witnesses.

CHARLES H. NORTON.

Witnesses:
   FRED'K C. BUTTERFIELD,
   HERBERT JOHNSON.